April 21, 1959 T. W. MOORE 2,883,607
STARTING SYSTEM FOR DYNAMO ELECTRIC MACHINES
Filed Sept. 29, 1954
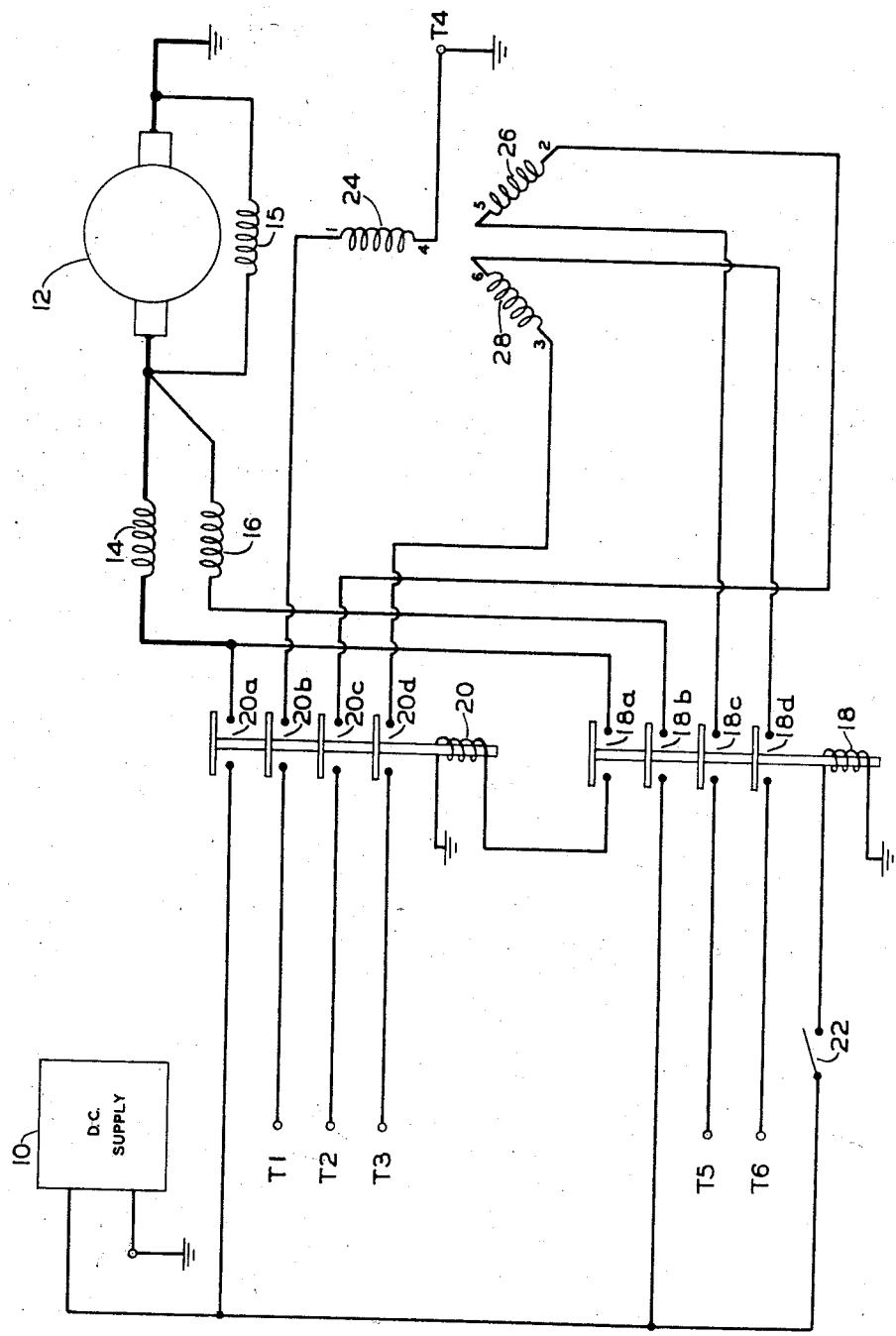
INVENTOR
THOMAS W. MOORE
BY
*Stewart F. Moore*
ATTORNEY

United States Patent Office 2,883,607
Patented Apr. 21, 1959

2,883,607

STARTING SYSTEM FOR DYNAMO ELECTRIC MACHINES

Thomas W. Moore, Dayton, Ohio, assignor to American Machine & Foundry Company, a corporation of New Jersey Application September 29, 1954, Serial No. 459,144

9 Claims. (Cl. 322—12)

This invention relates to electrical control systems and more particularly to an electrical starting system for a dynamo electric machine.

Heretofore, it has been the usual practice in starting certain types of direct current motors to utilize a circuit arrangement whereby a high resistance series winding is energized in series with the usual series field during the initial starting cycle, but is shorted out when the motor approaches operating speed. The series field has sufficient resistance and inductance to limit initial starting surges and also contributes to starting torque so as to reduce acceleration time. However, such an arrangement requires that a main line relay and an auxiliary starting contactor, which serves to short out the high resistance starting winding, must each be capable of carrying full load current of the machine. Furthermore, the shorting relay does not contribute in any manner to the operation of the machine once the starting cycle is over. Such relays are large and heavy since the contacts are required to carry and break the full load current, thus necessitating relays of the high pressure contact type so as to maintain low contact resistance.

By utilizing such a starting arrangement, a further disadvantage arises as the shorted series winding constitutes a short circuit on the field, acting much as a damper winding, and limits rapid changes in field flux.

It is, therefore, an object of the invention to provide a starting system for a dynamo electric machine in which all starting windings are utilized to contribute the field flux during periods of normal operation.

It is a further object of the invention to provide a starting control system for a dynamo electric machine which is small, lightweight, and low in cost.

It is another object of the invention to provide a starting control system for a dynamo electric machine which has no induced circulating current in a closed field loop during operation of the machine to affect the speed of machine response.

In aircraft applications of dynamo electric machines, which are usually inverters for converting 24 volts D.C. to a 400 cycle A.C. voltage, reduction in the weight of the machine is a primary consideration. Heretofore, when three-phase inverters for aircraft use have utilized D.C. starting circuits of the type described above, a number of contactors in addition to those necessary to start the D.C. portion of the inverter have been required to connect the three-phase output of the alternator to its load lines. Such additional contactors add undesirable weight to the inverter.

It is, therefore, another object of the invention to provide a starting system for a dynamo electric machine of the inverter type which utilizes a minimum number of contactors for performing the dual function of starting the machine and connecting the A.C. portion thereof to its load.

For a better understanding of the invention, together with other and further objects thereof, reference is made to the following detailed description taken in connection with the accompanying drawing, in which a schematic wiring diagram of the motor starting control system is shown.

Referring to the drawing, a source of D.C. supply is indicated at 10, and for the purpose of illustration may be of the type conventionally used in aircraft, that is, a 24-volt supply, the negative side of which is grounded. However, any suitable supply voltage for which the motor is adapted may be used. The motor to be controlled has an armature 12, supplied from D.C. source 10 and a shunt field 15 connected thereacross in accordance with usual D.C. motor technique. For purposes of illustration, a short shunt connection is shown. However, a long shunt connection of the shunt field directly across the line may be made if desired.

Connected to one side of armature 12 are series field windings 14 and 16. The other side of the armature is connected to ground, so as to provide a return path for the 24 volt D.C. supply. The entire series field windings, which may comprise one or more field coils, is wound with a conductor formed from a number of wires adapted to be connected in parallel. A selected number of these wires, for example, 20% of the total number of conductor wires, although as high as 50% may be used if desired, are connected together and have one end connected to armature 12. These wires are indicated as windings 16, and have their other ends connected to normally open contacts 18B of relay 18. All of the windings have conductor wires of the same diameter, but windings 14, the remaining 80% of the winding conductor wires, have a lower electrical resistance due to their greater number of parallel connected turns.

The other side of contacts 18B is connected to the positive terminal of D.C. power supply 10. One end of main series field windings 14 is connected to one side of armature 12 while the other end is connected to the positive terminal of D.C. supply 10 through normally open contacts 20A of relay 20.

A terminal of the energizing coil of relay 18 is connected to the positive side of the D.C. power supply 10 through a suitable switch 22, while the other terminal is connected to ground to form a return circuit to the D.C. power supply 10. Relay energizing coil 20 has one terminal connected through contacts 18A to the ungrounded terminal of armature 12, while the other terminal is connected to D.C. power supply 10 through a ground connection.

For purposes of illustration, an inverter of the type which converts 24 volts D.C. to a 400 cycle A.C. voltage is illustrated. However, it is understood that the starting system may be employed with any suitable type of D.C. machine, and need not be used in conjunction with an alternator.

The A.C. portion of the inverter may be a three-phase alternator and is shown in the schematic drawing as having output windings 24, 26 and 28 which may be connected in a star or delta arrangement as desired. Winding 24 is connected to terminal T1 through contacts 20B and its other end is connected to ground through terminal T4. Winding 26 is connected to terminals T2 and T5 through contacts 20C and 18C respectively. Winding 28 is connected to terminals T3 and T6 through contacts 20D and 18D respectively.

To start the inverter, switch 22 is closed, thereby energizing the coil of normally open relay 18 and closing the normally open contacts thereof. Line voltage is thus applied to starting winding 16, and simultaneously a portion thereof is applied to shunt windings 15 of D.C. motor 12. Due to the high resistance of the starting windings 16 since they comprise only 20% of the total field windings, the motor armature current is limited to a safe value during the period when the armature is attaining speed and the counter E.M.F. from the armature is increasing.

As soon as rotating armature 12 has increased in speed sufficient to develop an appreciable counter E.M.F., the actuating coil of voltage sensitive relay 20 is energized as it is connected to the ungrounded side of the armature during the starting period through contacts 18A and de-energized windings 14. When relay 20 is energized the normally open contacts thereof close and apply full line voltage to contact 20A through the main portion of the field coils 14. Since the motor is not quite up to operating speed at this time, the line current is again sufficiently higher than normal, thereby tending to increase accelerating torque and aid the armature to reach quickly its normal operating speed. Actuation of relay 20 may be adjusted to occur at any desired speed or value of counter E.M.F. However, it is preferable that the contacts of relay 20 close at a point during the starting cycle when the starting surge current is substantially past its peak value, but closing should not be so long delayed that a good accelerating torque characteristic is not obtained. The setting of relay 20 will depend on the operating characteristics of each motor to which the invention is adapted.

Relays 18 and 20 remain energized until switch 22 is opened to shut off the machine. Therefore, the contacts of these relays distribute the armature or line current in inverse proportion to the ratio of resistances of windings 14 and 16. As neither relay carries the full operating line current, lighter and cheaper relays may be used to perform their function. By thus utilizing portions of the winding conductors as starting windings and later connecting them in parallel to provide a single, large conductor, closed short circuited loops with high circulating currents and attendant overheating problems are eliminated.

It is desirable not to connect the alternator windings to the A.C. lines until such time as the alternator is up to speed and generating approximately full line voltage since until that time it functions merely as an additional line load impedance. Premature application of the load increases the D.C. armature current and the duration of the starting period, both of which increase the danger of starting winding burn out from overheating. Windings 24, 26 and 28 are therefore applied to the line in two steps, coincidental with the starting of the D.C. motor portion of the inverter. Thus, energization of the D.C. motor starting relay 18 also connects one end or portion of windings 26 and 28 to terminals T5 and T6. At this point no A.C. line current can flow through any of the alternator windings although half of the total number of winding terminals have been connected to the load lines at this stage.

When the speed of the D.C. motor 12 has reached a point where operating relay 20 is energized, sufficient A.C. voltage is being generated so that alternator windings 24, 26 and 28 may be applied to the line without danger of high circulating currents. Accordingly, energization of relay 20 connects the open ends of windings 24, 26 and 28 to terminals T1, T2 annd T3 to apply full A.C. voltage from the inverter to the load lines. Alternator disconnection is performed in reverse fashion when switch 22 is opened. By utilizing D.C. starting motor relays 18, 20 in this manner to connect alternator windings 24, 26 and 28 to the lines, a great savings in the number of necessary control relays results and a reduction in weight is effected.

Furthermore, as each relay is identical to its complement, both primary and secondary relays are interchangeable, and since each relay has four contacts, a balanced physical structure resistant to shock may be utilized.

For purposes of illustration, the starting system described has its field windings divided into two portions with only two energizing relays therefor in order to minimize component weight. It is understood that any practical number of groups of conductors may be employed to more smoothly bring the motor up to operating speed. It is obvious to one skilled in the art that such additional windings would be switched into operating connection with each other by means of a plurality of interconnected relays responsive to selected values of armature counter E.M.F.

While the present invention has been disclosed by means of a specific illustrative embodiment thereof, it would be obvious to those skilled in the art that various changes, and modifications in the means of operation described or in the apparatus may be made without departing from the spirit of the invention as defined in the appended claims.

I claim:

1. A starting device for a dynamo electric machine having an armature and field windings in series connection therewith, comprising first electrical energizing means connected to a first portion of said field windings and operative to initiate the starting cycle of said machine, and second electrical energizing means connected to a second portion of said windings, said second means being operative in response to a preselected armature counter electromotive force to energize said second named winding portion and connect said windinng portion in parallel with said first named winding portion.

2. A starting system for a dynamo electric machine comprising an armature for said machine, field coils for said machine having windings arranged in a plurality of electrically separable groups, first means for energizing at least one of said groups of windings to cause said armature to rotate, and at least one other means for connecting at least another of said groups in parallel with said first named group, each of said last named means being operative in response to a pre-selected armature counter electromotive force to energize one of said last named groups of windings.

3. A starting system for a dynamo electric machine comprising an armature, field coils for said machine having windings arranged in a plurality of electrically separable groups, first means for energizing at least one of said groups to cause said armature to rotate, and second means for connecting in parallel with said first named group, at successive, sequentially selected intervals, other groups of said windings, each of said last named means being operative in response to a pre-selected armature counter electromotive force to energize one of said last named groups of said windings during each of said intervals.

4. A starting system for a dynamo electric machine comprising in combination an armature for said machine, field windings for said machine connected in series with said armature, said windings including a plurality of conductors, selected portions of said conductors being connected in electrically parallel relationship to form electrically separable groups of conductors, first means for energizing at least one of said groups of conductors to cause said armature to rotate, and at least one other means for connecting at least another of said groups of conductors in parallel with said first named group, each of said last named means being operative in response to a pre-selected armature counter electromotive force to energize one of said last named groups of windings.

5. A starting system for a dynamo electric machine comprising in combination an armature for said machine, field windings for said machine connected in series with said armature, said windings including a plurality of conductors, selected portions of said conductors being connected in electrically parallel relationship to form electrically separable groups of conductors, first electrical energizing means connected to a first portion of said conductors and operative to initiate the starting cycle of said machine, and second energizing means connected to a second portion of said conductors, said second portion of conductors having substantially less resistance than said first portion, said second means being operative in response to a pre-selected armature counter electromotive force to energize said second named conductive portions and connect said conductive portions in parallel with said first named conductive portions whereby minimum series field resistance is secured.

6. A starting system for a dynamo electric machine comprising in combination an armature for said machine, field windings for said machine connected in series with said armature, said windings including a plurality of conductors, selected portions of said members being connected in electrically parallel relationship to form electrically separable groups of conductors, first electrical energizing means connected to a first portion of said conductors and operative to initiate the starting cycle of said machine, and second energizing means connected to a second portion of said conductors, said second portion of conductors having at least 50% of the total number of said winding conductors connected in parallel, said second means being operative in response to a pre-selected armature counter electromotive force to energize said second portion.

7. A starting system for a motor generator set comprising an alternating current generator having output windings and an output circuit, a direct current motor for driving said generator, said motor including an armature winding and a series field coil having windings arranged in a plurality of electrically separable groups, first means for energizing at least one of said groups of windings to cause said armature to rotate, at least one other means for connecting at least another of said groups in parallel with said first named group, said last named means being operative only in response to actuation of said first named means, and said first named means including means for connecting a portion of said alternator windings to said output circuit and said second named means including means for operatively connecting the remaining portion of said alternator windings to said output circuit whereby said alternator is connected to said output circuit only when said direct current motor armature has reached substantially normal operating speed.

8. The method of starting a motor generator set, said set including an alternating current generator having groups of output windings and a direct current motor for driving said generator having an armature and groups of field windings in series therewith, comprising the steps of electrically energizing a first group of said motor field windings to cause said motor armature to begin to rotate, connecting a first group of said alternator windings to an output circuit when said first group of motor field windings is energized, connecting a second group of said motor field windings in parallel with said first named motor field winding group after said armature has reached a predetermined rotating speed, and connecting a second group of said alternator windings to said output circuit when said second group of said motor field windings have been energized, whereby said alternator windings are operative to deliver power to a load only when said direct current motor armature is rotating at substantially normal operating speed.

9. The method of actuating a starting relay of a dynamo electric machine having an armature and field windings separated into electrically separable groups in series therewith, said relay being adapted to connect the armature circuit of said machine to a source of energy, comprising the steps of electrically energizing a first group of said windings to cause said armature to begin to rotate whereby a counter electromotive force is induced in the remainder of said groups of field windings, and impressing a selected magnitude of said induced electromotive force on said relay whereby said relay actuates to place said armature circuit in electrically operative condition.

References Cited in the file of this patent

UNITED STATES PATENTS

| | | |
|---|---|---|
| 2,350,680 | Heintz | June 6, 1944 |
| 2,482,513 | Rossignol et al. | Sept. 20, 1949 |